United States Patent
Koch et al.

(10) Patent No.: US 7,269,163 B1
(45) Date of Patent: Sep. 11, 2007

(54) REMOTE CONTROL TELEPHONE DIALING SYSTEM AND METHOD

(75) Inventors: Robert A. Koch, Norcross, GA (US); David Scott, Norcross, GA (US); Robert G. Hensey, Jr., Norcross, GA (US)

(73) Assignee: AT&T Intellectual Property, Inc., Wilmington, DE (US)

( * ) Notice: Subject to any disclaimer, the term of this patent is extended or adjusted under 35 U.S.C. 154(b) by 963 days.

(21) Appl. No.: 09/966,300

(22) Filed: Sep. 27, 2001

(51) Int. Cl.
*H04L 12/66* (2006.01)
*H04M 3/42* (2006.01)

(52) U.S. Cl. .................. 370/352; 370/401; 379/210.01; 379/900; 379/202.01

(58) Field of Classification Search ................ 370/352, 370/353, 389, 401.4; 379/142.01, 142.15, 379/265.09, 202.01, 210.01
See application file for complete search history.

(56) References Cited

U.S. PATENT DOCUMENTS

| | | | |
|---|---|---|---|
| 5,438,568 A | | 8/1995 | Weisser, Jr. |
| 6,192,123 B1 * | | 2/2001 | Grunsted et al. ........... 379/350 |
| 6,263,064 B1 * | | 7/2001 | O'Neal et al. .............. 370/352 |
| 6,324,264 B1 * | | 11/2001 | Wiener et al. .............. 370/352 |
| 6,377,576 B1 * | | 4/2002 | Zwick et al. ............... 370/352 |
| 6,430,282 B1 * | | 8/2002 | Bannister et al. ...... 379/220.01 |
| 6,640,242 B1 * | | 10/2003 | O'Neal et al. ........... 379/88.17 |
| 6,694,007 B2 * | | 2/2004 | Lang et al. ................. 370/352 |
| 6,731,625 B1 * | | 5/2004 | Eastep et al. ............... 370/352 |
| 6,747,970 B1 * | | 6/2004 | Lamb et al. ................ 370/352 |
| 6,829,236 B1 * | | 12/2004 | Archer ....................... 370/353 |
| 6,853,636 B1 * | | 2/2005 | Merchant .................... 370/352 |
| 6,879,678 B1 * | | 4/2005 | Lang ..................... 379/201.01 |
| 6,990,094 B1 * | | 1/2006 | O'Neal et al. .............. 370/352 |

FOREIGN PATENT DOCUMENTS

| | | | |
|---|---|---|---|
| GB | 2320641 A | * | 6/1998 |
| WO | WO 0048378 A1 | * | 8/2000 |
| WO | WO 0117216 A2 | * | 3/2001 |

OTHER PUBLICATIONS

"Lucent Technologies Announces Click-to-Dial Web Services and Intelligent Network Capabilities for Voice Over Data Networks," May 12, 1999.

\* cited by examiner

*Primary Examiner*—Steven Nguyen
(74) *Attorney, Agent, or Firm*—Withers & Keys, LLC

(57) ABSTRACT

An apparatus for allowing a calling party to initiate a telephone call from an Internet-enabled device. The apparatus includes a server for receiving an originating telephone number and a destination telephone number in response to a command from the Internet-enabled device, for generating a call request, and for transmitting the request to a telecommunications network to request the network to establish a connection between the originating telephone number and the destination telephone number.

15 Claims, 2 Drawing Sheets

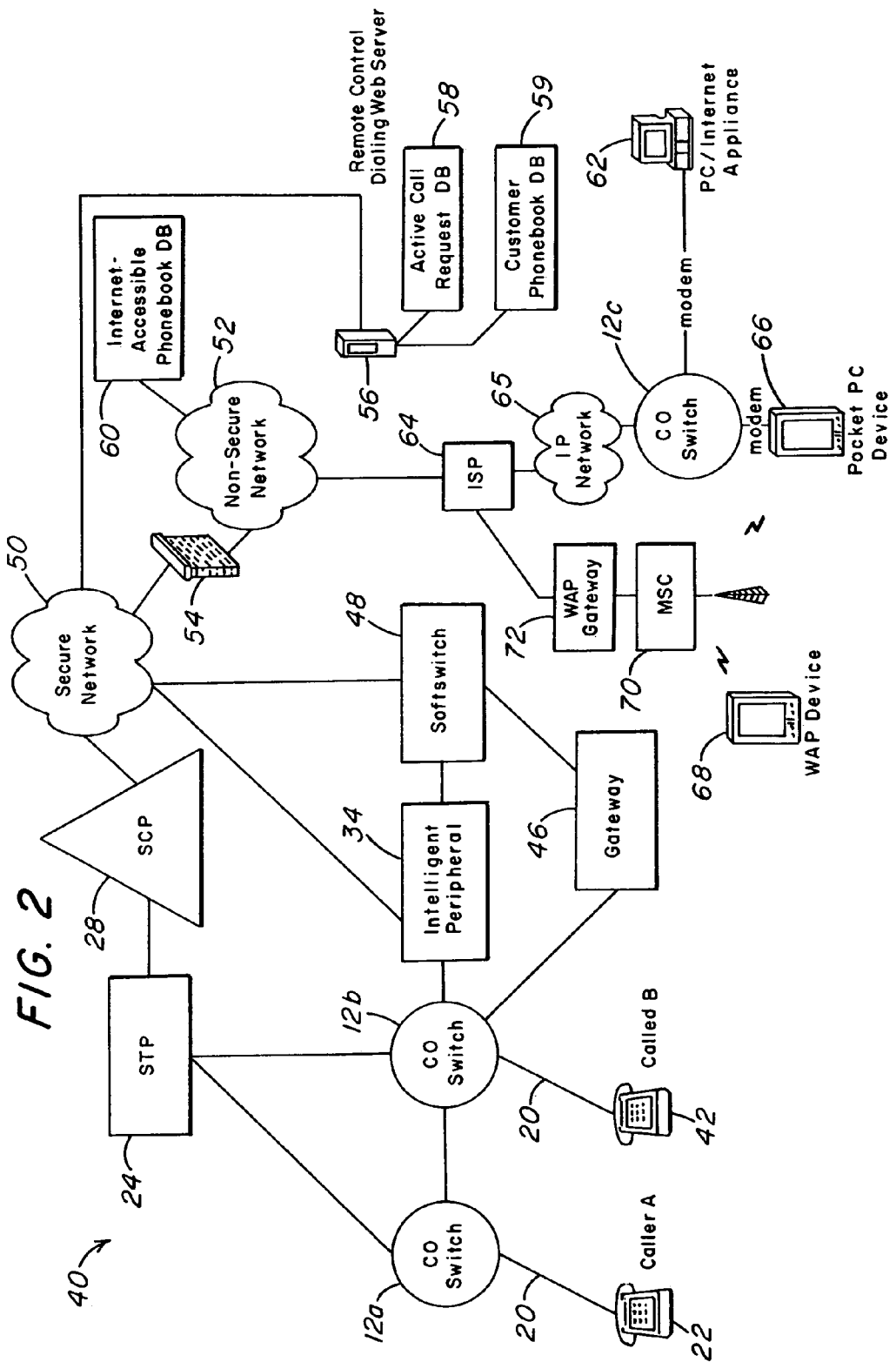

REMOTE CONTROL TELEPHONE DIALING SYSTEM AND METHOD

TECHNICAL FIELD

The present invention is directed generally to the field of telecommunications and, more particularly, to Internet-telephony communications.

BACKGROUND

Placing a telephone call has typically required a caller to first locate the name of the party to be called in a phonebook, and then manually enter their corresponding number using a telephone keypad or dial. The introduction of personal computers and electronic organizers has simplified this task, and through the use of software-based organizational utilities a caller can quickly sort through sizable lists of contacts and associated numbers. Nonetheless, if the person to be called is not included in the caller's listing, the caller must resort to a frequently time-consuming search of a phonebook to locate the desired information. Moreover, a caller is typically left with no record of the telephone call unless the called party is located outside of the caller's local calling area and thus requires a toll call by the caller, a record of which subsequently appears on the caller's telephone bill. This, however, is the only information about the telephone call that is automatically recorded for the caller. Any other information regarding the telephone call would have to be memorialized by the caller or forever lost.

Another problem often facing the caller is the imposition of high rates when placing calls from certain locations. Hotels, for example, commonly charge a dollar or more for a local call, and upwards of several dollars per minute for long distance service.

The advent and exponential growth of the Internet in recent years has substantially altered the way in which information is exchanged. The use of electronic mail for personal and business communication has become routine, and the use of the Internet to conduct commercial transactions is attaining similar popularity. With the development of wireless technologies, access to the Internet is no longer confined to the desktop computer and has expanded to include a variety of mobile communication devices such as wireless personal digital assistants (PDA's) and interactive pagers.

Although Internet-based communication continues to grow and evolve, it has made few inroads into the world of traditional telephony. No method exists for creating a synergistic relationship between the two media to provide consumers with an improved system of conducting everyday telephonic communication.

Thus, a need exists for a service that makes available an interface between telephony and the Internet, providing the caller with a more economical and less-burdensome means of placing calls and maintaining records of calls.

SUMMARY

The present invention is directed to an apparatus for allowing a calling party to initiate a telephone call from an Internet-enabled device. The apparatus includes a server for receiving an originating telephone number and a destination telephone number in response to a command from the Internet-enabled device, for generating a call request, and for transmitting the request to a telecommunications network to request the network to establish a connection between the originating telephone number and the destination telephone number.

By combining the advanced features of Internet communication with traditional telephony, the present invention provides callers with more economical and less-burdensome means to place calls and maintain accurate call records. The present invention may also function as a diagnostic tool, allowing service personnel to initiate calls and verify operation of services from remote locations.

BRIEF DESCRIPTION OF THE FIGURES

The present disclosure will be described in conjunction with the following figures, wherein:

FIG. 2 illustrates an embodiment of a remote control telephone dialing system of the present invention

DETAILED DESCRIPTION

Figure 1:
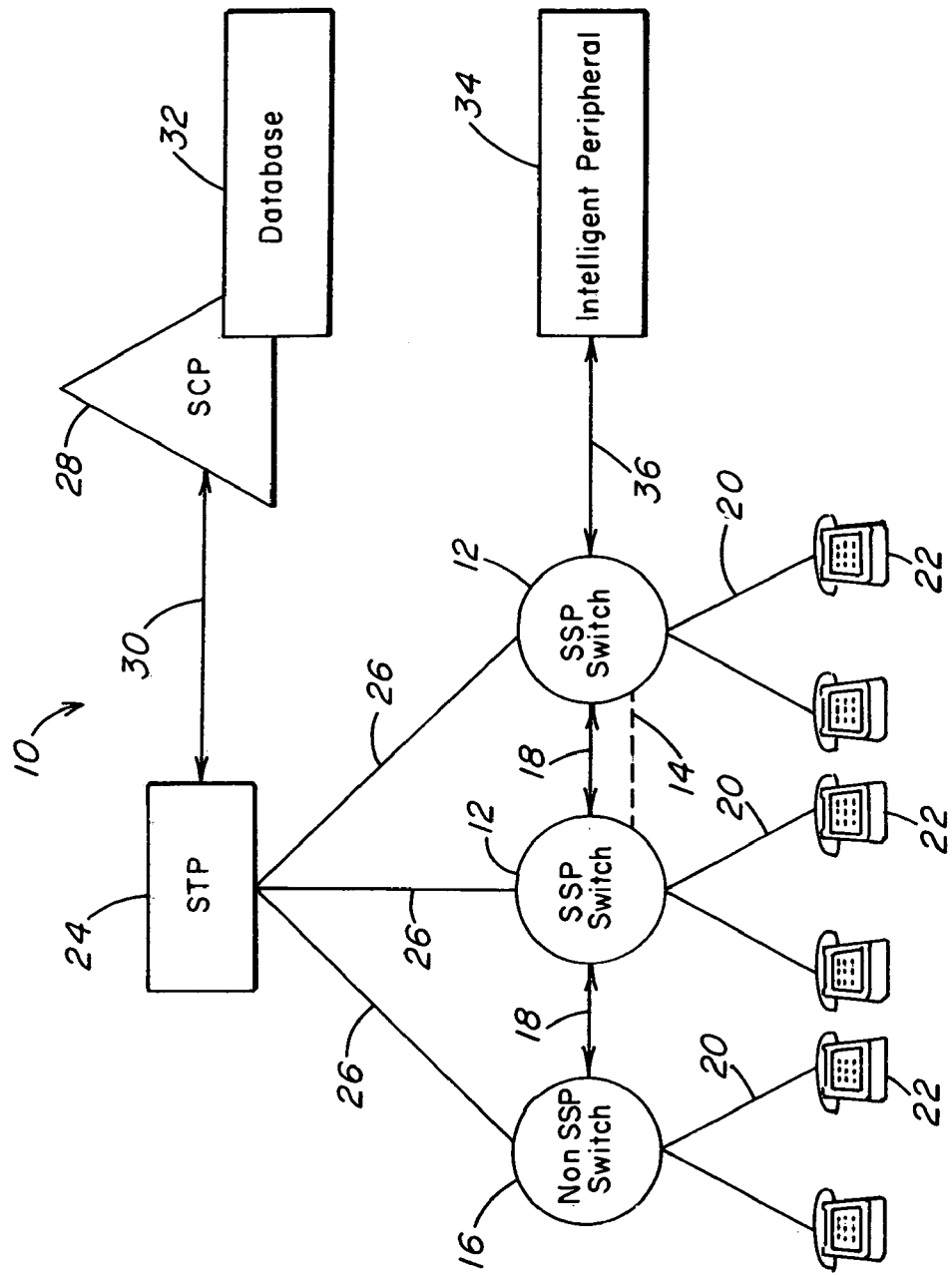
FIG. 1 illustrates an embodiment of an Advanced Intelligent Network.

The term "calling party" is used herein generally to refer to the person or unit that initiates a telecommunication. The calling party may also be referred to herein as "caller" or "customer." In some cases, the calling party may not be a person, but may be a device such as a facsimile machine, an answering service, a modem, etc. The term "called party" is used herein generally to refer to the person or unit that answers or responds to the call or communication. The term "communication" is used herein to include all messages or calls that may be exchanged between a calling party and a called party, including voice, data and video messages. The term "communication" is used synonymously herein with the term "call" unless a distinction is noted.

The present invention, according to one embodiment, is directed to a remote control telephone dialing system and method for allowing a calling party to initiate a call from a wireless or wireline Internet-connected device. According to one embodiment, the calling party first selects the name of a called party from a list stored in the electronic memory of the Internet-connected device, or alternatively, from a phonebook database accessible via the Internet. Associated with the selected called party's name is the directory number of the called party. The caller next specifies a location from which the call is being placed. Associated with the location is the directory number of the calling party. The directory numbers of the caller and called party are then transmitted via a computer network to a circuit-switched telephone network, connecting the telephone at the caller's specified location to the telephone of the called party. Additionally, as explained below, information regarding the result of the requested call such as, for example, call duration, may be returned from the telephone network to the caller's Internet-connected device and stored in a log file therein.

The present invention may utilize the intelligent functionality of an Advanced Intelligent Network (AIN). The AIN is a network used in conjunction with a conventional telephone network, such as the public switched telephone network (PSTN), to provide enhanced voice and data services and dynamic routing capabilities using two different networks. The actual voice call is transmitted over a circuit-switched network, but the signaling is done on a separate packet-switched network. Before describing further details of the present invention, a description of the AIN is provided.

FIG. 1 is a block diagram of an Advanced Intelligent Network (AIN) 10 for integration with the public switched telephone network (PSTN). The AIN 10 may be employed by a Local Exchange Carrier (LEC), and may be utilized by the LEC to allow the LEC to provide call processing features and services that are not embedded within conventional switching circuits of the PSTN.

A typical LEC includes a number of central office (CO) switches for interconnecting customer premises terminating equipment with the PSTN. For an LEC including the AIN 10 as illustrated in FIG. 1, the central office switches may be provided as Service Switching Points (SSP) switches 12. The dashed line 14 between the SSP switches 12 indicates that the number of SSP switches 12 in the AIN 10 may vary depending on the particular requirements of the AIN 10. The AIN 10 may also include a non-SSP switch 16. The difference between the SSP switches 12 and the non-SSP switch 16 is that the SSP switches 12 provide intelligent network functionality. Interconnecting the SSP switches 12 and the non-SSP switch 16 are communication links 18 which may be, for example, trunk circuits.

Each SSP switch 12 and non-SSP switch 16 has a number of subscriber lines 20 connected thereto. The subscriber lines 20 may be, for example, conventional twisted pair loop circuits connected between the switches 12, 16 and the telephone drops for the customer premises, or the subscriber lines 20 may be trunk circuits, such as T-1 trunk circuits. Typically, the number of subscriber lines 20 connected to each switch 12, 16 is on the order of ten thousand to one hundred thousand lines. Each of the subscriber lines 20 is connected to a terminating piece of customer premises equipment, represented in FIG. 1 by the landline telephones 22. Alternatively, the terminating equipment may be another type of telecommunications unit such as, for example, a telecopier, a personal computer, a modem, or a private branch exchange (PBX) switching system.

For the AIN 10 illustrated in FIG. 1, each SSP switch 12 and the non-SSP switch 16 are connected to a signal transfer point (STP) 24 via a communication link 26. The communication link 26 may employ, for example, the SS7 switching protocol. The STP 24 may be a multi-port high-speed packet switch that is programmed to respond to the routing information in the appropriate layer of the switching protocol, and route the data packets to their intended destination.

One of the intended destinations of the data packets from the STP 24 is a service control point (SCP) 28. The STP 24 is in communication with the SCP 28 via a communication link 30, which may also employ the SS7 switching protocol. The SCP 28 may be an intelligent database server such as, for example, an Intelligent Network Service Control Point available from Lucent Technologies Inc., Murray Hill, N.J., and may have associated with it a network database 32 for storing network data. The intelligent functionality of the SCP 28 may be realized by application programs, such as programmable Service Program Applications (SPA), which are run by the SCP 28. The SCP 28 is normally employed to implement high volume routing services, such as call forwarding and number portability translation and routing. In addition, another of the functions of the SCP 28 is hosting of the network database 32, which may store subscriber information, such as subscriber call management profiles, used in providing enhanced calling services.

The AIN 10 illustrated in FIG. 1 also includes an intelligent peripheral device (IP) 34. The IP 34 may be a services node such as, for example, a Compact Services Node (CSN) available from Lucent Technologies Inc., Murray Hill, N.J., although the IP 34 may be any other type of available AIN-compliant intelligent peripheral device. The IP 34 may be connected to one or more of the SSP switches 12 via a communications link 36 which may be, for example, an Integrated Service Digital Network (ISDN), including BRI (Basic Rate Interface) or PRI (Primary Rate Interface) lines. According to other embodiments, the communications link 36 may be, for example, a T-1 trunk circuit.

The IP 34 may be used primarily when some enhanced feature or service is needed that requires an audio connection to the call such as, for example, the call return and calling name services. Similar to the SCP 28, the intelligent functionality of the IP 34 may be realized by programmable applications executable by the IP 34.

In order to keep the processing of data and calls as simple as possible at the switches, such as at the SSP switches 12, a set of triggers may be defined at the SSP switches 12 for each call. A trigger in an AIN is an event associated with a particular subscriber line 20 that generates a data packet to be sent from the SSP switch 12 servicing the particular subscriber line 20 to the SCP 28 via the STP 24. The triggers may be originating triggers for calls originating from the subscriber premises or terminating triggers for calls terminating at the subscriber premises. A trigger causes a message in the form of a query to be sent from the SSP switch 12 to the SCP 28.

The SCP 28 in turn interrogates the database 32 to determine whether some customized call feature or enhanced service should be implemented for the particular call, or whether conventional dial-up telephone service should be provided. The results of the database inquiry are sent back from the SCP 28 to the SSP switch 12 via the STP 24. The return packet includes instructions to the SSP switch 12 as to how to process the call. The instructions may be to take some special action as a result of a customized calling service or enhanced feature. For example, for an enhanced calling feature requiring the capabilities of the IP 34, the return message from the SCP 28 may include instructions for the SSP switch 12 to route the call to the IP 34. In addition, the return message from the SCP 28 may simply be an indication that there is no entry in the database 32 that indicates anything other than conventional telephone service should be provided for the call. The query and return messages may be formatted, for example, according to conventional SS7 TCAP (Transaction Capabilities Application Part) formats. U.S. Pat. No. 5,438,568, which is incorporated herein by reference, discloses additional details regarding the functioning of an AIN.

The AIN 10 illustrated in FIG. 1 includes only one STP 24, one SCP 28, one network database 32, and one IP 34, although the AIN 10 may further include an additional number of these components as well as other network components, which are not included in FIG. 1 for purposes of clarity. For example, the AIN 10 may additionally include redundant SCPs and STPs to take over if the STP 24 or the SCP 28 should fail. In addition, the AIN 10 may include an Automatic Electronic Switching System (AESS) Network Access Point (NAP) in communication with the STP 24, which may be programmed to detect the trigger conditions. Further, the AIN 10 may include regional STPs and regional SCPs in communication with, for example, the local STP 24, for routing and servicing calls between different LECs.

FIG. 2 is a diagram illustrating a system 40 according to one embodiment of the remote control telephone dialing service of the present invention. The system 40 includes portions of the AIN described in conjunction with FIG. 1, including SSP switches 12a-b (designated as "CO SWITCH"), the SCP 28, and the IP 34.

For purposes of describing features of the present invention, the calling party is a user of a telephone 22 and a wireless or wireline Internet-connected device 62, 66, 68. The called party is a user of a second telephone 42. According to one embodiment, the present invention allows the caller to initiate a telephone call from any device capable of Internet communication such as, for example, a pocket PC device 66 (also sometimes called a "palmtop PC"). An example of a pocket PC device 66 is a Hewlett-Packard Jornada® with a Microsoft Windows® operating system. Examples of other devices that may be used in accordance with the present invention include PDA's (not shown), interactive pagers (not shown), and WAP devices 68. The WAP device 68 can be connected to a non-secure network 52 via a mobile switching center (MSC) 70 and a WAP gateway 72, in communication with an internet service provider (ISP) 64. The non-secure network 52 may be the Internet, for example. Other types of devices including, for example, the pocket PC device 66 may access the non-secure network 52 through a wireless front-end interface. A caller may also access the non-secure network 52 using a personal computer (PC) 62. The PC 62 may be connected to the non-secure network through the ISP 64. The PC 62 may be in communication with the ISP 64 through, for example, a CO switch 12*c* and an Internet protocol (IP) network 65. For clarity, embodiments of the present invention described below utilize a pocket PC device 66. Those skilled in the art will recognize that other Internet-connected communication devices may be used instead. Additionally, the telephone of the called party 42 may be any device or system capable of receiving telephone communications.

As also illustrated in FIG. 2, the system 40 may include a gateway 46 and a softswitch 48 in communication with components of the AIN, including, for example, the IP 34 and/or the CO switch 12*b*. The gateway 46 may be, for example, an SS7/IP gateway for performing protocol conversions between the SS7 and IP (Internet Protocol) protocols. The softswitch 48 may be a programmable network switch that can process all types of packet protocols. In addition, according to other embodiments of the invention, either of the CO switches 12*a-b* may instead by a softswitch, although embodiments of the present invention will be described hereinafter as if the switch in communication with telephone devices 22 and 42 are CO switches.

The system 40 may also include a secure network 50 in communication with the SCP 28, IP 34, and softswitch 48 of the AIN 10. The secure network 50 may be a secure IP network such as, for example, a secure intranet. The secure network 50 may be in communication with the non-secure network 52. To maintain the security of the secure network 50, a firewall 54 may be provided between the secure network 50 and the non-secure network 52.

The system 40 may also include a general-purpose computer 56 (hereinafter "Remote Control Dialing Web Server") and one or more associated databases, shown generally at 58, 59 on FIG. 2. The Remote Control Dialing Web Server 56 may be any type of computer capable of communicating with one or more databases 58, 59 and transmitting information contained therein via the secure network 50. The first database 58 (hereinafter "Active Call Request Database") may store customer call requests and associated information. The second database 59 (hereinafter "Customer Phonebook Database") may store customer phonebook information accessible only to subscribers of the remote telephone dialing service described by the present invention. A third database 60 (hereinafter "Internet-accessible Phonebook Database"), not associated with the Remote Control Dialing Web Server 56, may store additional phonebook information and may be accessed directly via the non-secure network 52. The Internet-accessible Phonebook Database 60 may be, for example, the BellSouth Yellow/White pages available on the Internet.

In one embodiment, the caller selects the name of the called party from a list stored in the electronic memory of the pocket PC device 66. Alternatively, if this information is not contained in the pocket PC device 66, the caller may choose to access and search the Customer Phonebook Database 59 or the Internet-accessible Phonebook Database 60. Access to each of the databases 59, 60 is accomplished using the pocket PC device 66. Because in one embodiment the Customer Phonebook Database 59 is available only to subscribers for a fee, a PIN may be required in order to obtain access. After locating the desired information, the caller may perform a download operation, thereby adding the called party's name and associated directory number to the electronic memory of the pocket PC device 66.

After obtaining the directory number of the called party 42, the telephone call may be initiated, for example, by first selecting the name of the called party 42 and then specifying the location from which the call is being placed. The caller may choose from one or more call locations programmed into the pocket PC device 66, such as "home," "office," or "hotel," for example. The caller may also enter an originating telephone number if the desired number is not stored in the device 66. Upon completing these selections, the caller can transmit this information to the Remote Control Dialing Web Server 56 by selecting, for example, a "Place Call" option provided by the pocket PC device 66. The directory numbers corresponding to the caller's selections constitute one aspect of the information transmitted to the Remote Control Dialing Web Server 56 from the pocket PC device 66. Additional information transmitted from the pocket PC device 66 to the Remote Control Dialing Web Server 56 may include the IP and/or email address of the pocket PC device 66.

In response to the information transmitted by the pocket PC device 66, the Remote Control Dialing Web Server 56 may create an entry in the Active Call Request Database 58. This entry can include the directory numbers of the caller and the called party, along with the IP and/or email address of the pocket PC device 66.

Following the creation of the database entry, the Remote Control Dialing Web Server 56 can transmit a message to the AIN 10 requesting that the call be placed. This message can be, for example, a Session Initiation Protocol (SIP) request sent via the secure network 50 to the SCP 28 of the AIN 10 shown in FIG. 1. SIP is an Internet Engineering Task Force (IETF) protocol used to initiate, modify, or terminate Internet telephony calls. SIP requests can be sent through any transport protocol such as, for example, Transmission Control Protocol (TCP). The SCP 28, as described above, can execute a SPA program to determine what customized call features or enhanced services should be implemented for a particular call. Accordingly, the SCP 28 interrogates its associated database 32 to determine if the remote control telephone dialing service described by the present invention should be provided in response to the SIP request. If the service is required, the SCP 28 may then send a TCAP message, "Create_Call", for example, to the appropriate CO switch 12*a-b* via the STP 24 requesting that a connection between the caller's telephone 22 and the called party's telephone 42 be created.

In one embodiment, after receiving the TCAP message from the SCP 28 via the STP 24 to create the call, the CO switch 12*a-b* first establishes the connection to the caller's telephone 22. The caller's telephone 22 may ring to indicate the completion of this connection, at which time the caller can answer. Upon sensing the off-hook condition of the caller's telephone 22, the CO switch 12*a-b* next completes the connection to the called party's telephone 42. The AIN 10 application running on the SCP 28 can take into account alternative call scenarios, such as a failure of the caller to pick up the telephone 22 after initiating a call, or if the called party's telephone 42 is busy.

In addition to requesting the CO switch 12*a-b* to place the call, the SCP 28 may also send a TCAP query to the CO switch 12*a-b* requesting a call disposition. In response to this query, the CO switch 12*a-b* may return information regarding the call request the SCP 28. This information, referred to as the call disposition, can include, for example, whether or not the call was answered, if the called party's line was busy, and the duration of the call if completed. The call disposition may be transmitted to the Remote Control Dialing Web Server 56 from the SCP 28 via the secure network 50. The Remote Control Dialing Web Server 56 may then relay the call disposition to the pocket PC device 66, where it can be stored in a log file for future reference. After the pocket PC device 66 has received the call disposition, the Remote Control Dialing Web Server's 56 record created in the Active Call Request Database 58 can be deleted.

It is to be understood that the present description illustrates those aspects of the invention relevant to a clear understanding of the invention. Certain aspects of the invention that would be apparent to those of ordinary skill in the art and that, therefore, would not facilitate a better understanding of the invention, have not been presented in order to simplify the present description. Although the present invention has been described in connection with certain embodiments, those of ordinary skill in the art will, upon considering the foregoing description, recognize that many modifications and variations of the invention may be employed. It is intended that all such variations and modifications of the inventions be covered by the foregoing description and following claims.

What is claimed is:

1. An apparatus for allowing a calling party to initiate a telephone call from an Internet-enabled device, the apparatus comprising:
    a server operative for:
        receiving an originating telephone number and a destination telephone number in response to a command from the Internet-enabled device, wherein at least the destination telephone number is imported from a database external to the server,
    generating a call request comprising a Session Initiation Protocol (SIP) request, and
    transmitting the request from a non-secure data network to a telecommunications network via a secure Internet Protocol network to request the telecommunications network to establish a connection between the originating telephone number and the destination telephone number, wherein the database external to the server is in communication with the non-secure data network and wherein the server stores the call request, the call request comprising an Internet Protocol address and an e-mail address of the Internet-enabled device.

2. The apparatus of claim 1, wherein the server transmits the call request to a service control point of the telecommunications network and wherein the call request includes instructions that cause the service control point to establish the connection through operation of at least one switch of the telecommunications network that is in communication with the service control point.

3. The apparatus of claim 1, wherein the telecommunications network includes an advanced intelligent network (AIN).

4. The apparatus of claim 1, further comprising a communications network for connecting the Internet-enabled device to the server.

5. The apparatus of claim 1, wherein the Internet-enabled device is selected from the group consisting of a personal computer, an Internet appliance, a personal digital assistant, a WAP-enabled device, and an interactive pager.

6. A method of enabling a calling party to initiate a telephone call, the method comprising:
    receiving a request to initiate the telephone call from a first device of a non-secure data network at a server of a secure data network, wherein the secure network is an Internet Protocol network and the first device is associated with the calling party;
    receiving an originating telephone number;
    receiving a destination telephone number by the first device accessing an online telephone directory of a database maintained on the non-secure data network; and
    transmitting a call request comprising a Session Initiation Protocol (SIP) request, the call request containing the originating telephone number and the destination telephone number from the server over the secure Internet Protocol network to a telecommunications network to request the telecommunications network to originate the telephone call from a second device associated with the originating telephone number to a third device associated with the destination telephone number, wherein the call request is stored on the server, the call request further comprising an Internet Protocol address and an e-mail address of the first device.

7. The method of claim 6, wherein receiving an originating telephone number includes receiving an originating telephone number from the first device.

8. The method of claim 6, wherein transmitting the call request comprises transmitting instructions to a service control point of the telecommunications network, the method further comprising the service control point generating commands to at least one switch to connect a call between the originating telephone number and the destination telephone number.

9. The method of claim 8, further comprising the service control point performing a look-up in an associated database to determine whether the requested call should be completed.

10. The method of claim 6, wherein transmitting a call request containing the originating telephone number and the destination telephone number to a telecommunications network includes transmitting the call request to an advanced intelligent network (AIN).

11. The method of claim 6, further comprising receiving one of an IP address and an email address of the first device.

12. The method of claim 6, further comprising accepting a personal identification number (PIN) from the first device.

13. A computer readable medium containing instructions that when executed by a computer perform acts for allowing a calling party to initiate a telephone call from an Internet-enabled device, the acts comprising:
    receiving a request from the Internet-enabled device of a non-secure network at a server of a secure Internet Protocol network to initiate the telephone call;
    receiving an originating telephone number;
    receiving a destination telephone number by a user of the Internet-enabled device providing a personal identification number after having accessed the server that allows access to a telephone directory database of the secure Internet Protocol network and receiving a selection of the destination number from the telephone directory via the Internet-enabled device; and transmitting a call request comprising a Session Initiation Protocol (SIP) request, the call request containing the originating telephone number and the destination telephone number to a telecommunications network via the secure Internet Protocol network to request the telecommunications network to establish a connection between the originating telephone number and the destination telephone number, wherein the server stores the call request, the call request further comprising an Internet Protocol address and an e-mail address of the Internet-enabled device.

14. The computer readable medium of claim 13, the acts further comprising preventing unauthorized requests for calls from Internet-enabled devices.

15. A system for allowing a calling party to initiate a telephone call from an Internet-enabled device, the system comprising:

a telecommunications network;

a non-secure IP network in communication with the Internet-enabled device; and a server of a secure IP network, separate from the non-secure IP network, the server operative for:

receiving an originating telephone number and a destination telephone number in response to a command from the Internet-enabled device, wherein the destination telephone number comes from a selection made by the Internet-enabled device from a telephone directory of the non-secure IP network, generating a call request comprising a Session Initiation Protocol (SIP) request, and transmitting the request to the telecommunications network via the secure IP network to request the telecommunications network to establish a connection between the originating telephone number and the destination telephone number, wherein the server stores the call request, the call request further comprising an IP address and an e-mail address of the Internet-enabled device.

* * * * *